(12) United States Patent
Ali et al.

(10) Patent No.: US 12,141,633 B2
(45) Date of Patent: Nov. 12, 2024

(54) METALLIC CHIPCARD HAVING A METAL LABEL THEREON

(71) Applicant: IDEMIA FRANCE, Courbevoie (FR)

(72) Inventors: Ahmed Ali, Courbevoie (FR); Tiphaine Groult, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 18/476,542

(22) Filed: Sep. 28, 2023

(65) Prior Publication Data

US 2024/0111981 A1     Apr. 4, 2024

(30) Foreign Application Priority Data

Sep. 29, 2022   (FR) ..................... 22 09874

(51) Int. Cl.
*G06K 19/02*     (2006.01)
*G06K 19/077*    (2006.01)

(52) U.S. Cl.
CPC ....... *G06K 19/02* (2013.01); *G06K 19/07722* (2013.01)

(58) Field of Classification Search
None
See application file for complete search history.

(56) References Cited

U.S. PATENT DOCUMENTS

2021/0154898 A1   5/2021   Lowe et al.
2023/0067229 A1   3/2023   Ali et al.

FOREIGN PATENT DOCUMENTS

| CH | 718 335 A2 | 8/2022 |
| FR | 3 105 856 A1 | 7/2021 |
| KR | 20080106755 A | * 12/2008 |

OTHER PUBLICATIONS

Machine translation of KR20080106755, FIT database, retrieved Apr. 5, 2024 (Year: 2024).*
French Preliminary Search Report and Written Opinion issued May 4, 2023 in French Application 22 09874 filed on Sep. 29, 2022, 9 pages.

* cited by examiner

*Primary Examiner* — Suezu Ellis
(74) *Attorney, Agent, or Firm* — Oblon, McClelland, Maier & Neustadt, L.L.P.

(57) ABSTRACT

A chipcard having a card body formed by at least one dielectric layer and one metal layer, the metal layer having a cavity and an outline, the metal layer further having a slit, the card further having an antenna extending in the cavity. The card further includes at least one metal label at least partially covering the cavity and the antenna, the label being fixed onto one of the faces of the card, the metal label having a metal layer comprising a pattern having a first part formed by first etched metal lines delimiting at least one zone that is at least partially of metal, and a second part made of second etched metal lines forming only open loops.

20 Claims, 2 Drawing Sheets

Figure 1
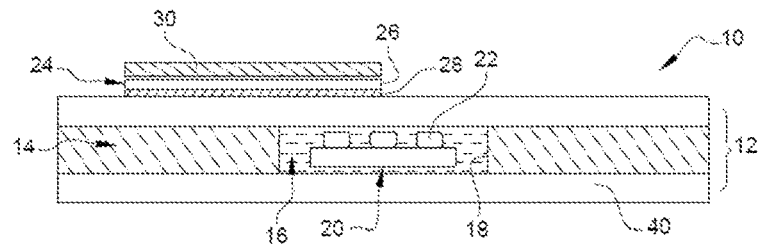
Fiugre 2
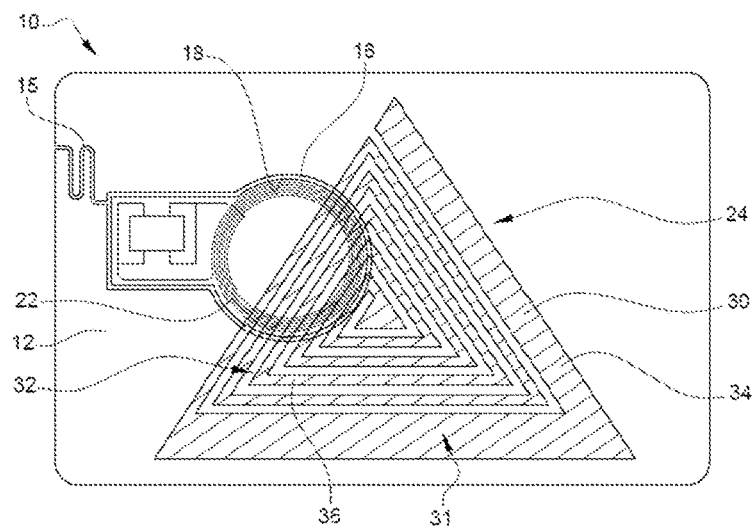
Figure 3
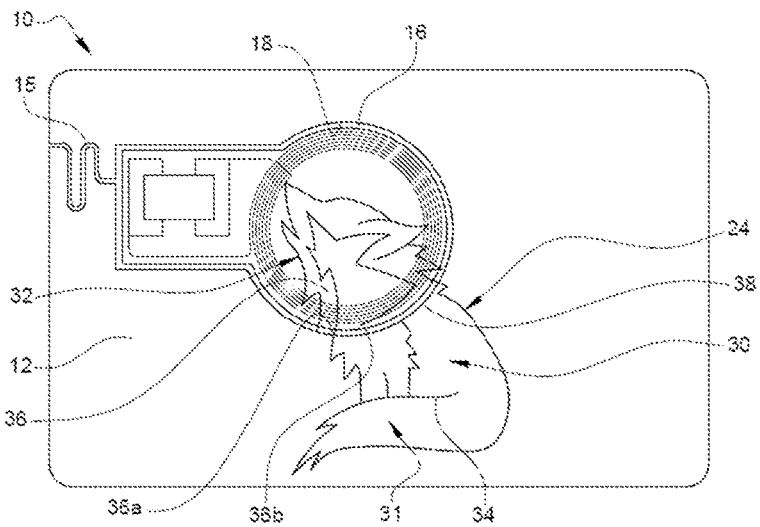

METALLIC CHIPCARD HAVING A METAL LABEL THEREON

TECHNICAL FIELD

The invention relates to chipcards and, more particularly, to chipcards that include an antenna allowing contactless communication with a reader.

The invention relates in particular to chipcards provided with an antenna and having a body composed of at least one metal layer, made of a rigid metal with a thickness greater than 100 µm. This type of card has the benefit of offering a card that is "heavy", this aspect being associated with an impression of solidity and quality, criteria that are being sought by the users.

PRIOR ART

Chipcards are known from the prior art that include a chip and an antenna. These chipcards are parameterised to communicate with an external reader either by contact, by insertion of the card into the reader, or remotely, in contactless mode, by bringing the card close to the reader. The contactless communication is generated in the radiofrequencies (RF) as specified in the standards ISO 14443/ISO15693 and ISO 10373-6 at 13.56 MHz.

These chipcards are generally bank cards used to perform banking transactions, but they can also serve as access means to transport, or even as loyalty cards or cards of membership to a medical or administrative service. They generally have a rectangular form with the following dimensions: 85.60 mm×53.98 mm and 0.76 mm thick, as stated in the standard ISO 7810.

When these chipcards are provided with a metal layer, that leads to constraints for the contactless communication with a reader. Indeed, the metal layer acts as an electromagnetic shielding on the antenna, which prevents or disrupts the RF communication with an external reader. The exchanges with the reader exhibit a quality that is inadequate, which can cause a transaction to be impossible for example.

This type of metallic card has therefore been adapted to allow the contactless communication. To this end, from the prior art, a metallic chipcard is known that comprises a through-cavity and a through-slit created in the metal layer. The slit opens on the outside of the card to attenuate the eddy currents. The antenna, deposited on a substrate, is positioned in the cavity. The metal layer thus surrounds the antenna, but does not cover it, so the shielding effect is therefore diminished. The effects of the eddy currents are reduced by the presence of the slit.

However, the visual aspect of the card is unsatisfactory in that the antenna and its substrate are then visible from both faces of the card. The antenna and the metal layer can be covered by a printed layer, but this solution is discarded because the user seeks a card that has a metallic visual effect, this card then being perceived as a luxury card.

From the document FR3105856, a solution is known for partially covering the antenna with the metal layer without degrading the communication capabilities of the antenna. In this solution, the cavity created in the metal layer has a bottom formed by a wall provided with through-apertures. These apertures ensure that the magnetic flux is not deflected, thus allowing a contactless communication with an external reader that is of adequate quality.

However, this structure is complex and costly to produce, notably for subdividing the zones without metal at the centre of the metal layer and disposed opposite the antenna.

The present invention aims to remedy this problem by proposing a metallic chipcard comprising
  a card body formed by at least one dielectric layer and one metal layer superposed on the dielectric layer,
  the metal layer comprising a cavity passing through its thickness and having an outline, the metal layer further comprising a slit passing through its thickness and extending from the cavity to an edge of the card body,
  the card further comprising an antenna extending in the cavity of the metal layer, characterized in that the card further comprises at least one metal label at least partially covering the cavity and the antenna, the label being fixed onto one of the faces of the card, the metal label comprising a metal layer, the metal layer comprising a pattern represented by etched metal lines,
  the pattern of the label comprising a first part formed by first etched metal lines delimiting at least one zone that is at least partially of metal,
  and a second part composed of second etched metal lines forming only open loops,
  each second line of the second part of the pattern prolongs a first line of the first part of the pattern, such that the second part of the pattern forms the continuity of the first part of the pattern to form the pattern in its entirety, and in that the metal label is positioned such that only the second part of the pattern is disposed opposite the antenna.

By virtue of these provisions, the chipcard has a metallic visual appearance over most of the surface of the card, while allowing a contactless communication with an external reader. In addition, each label can be personalised and the holder of the card can therefore obtain a unique pattern, which tends to increase the prestige associated with the card.

Other advantageous and nonlimiting features of the method according to this first embodiment, taken individually or in all technically possible combinations, are as follows:
  the second metal lines extend between a proximal end and a distal end and do not have any intersection with another first or second metal line,
  the outline of the second part is delimited by the hypothetical line joining all of the points forming the proximal ends and the distal ends of the second metal lines of the second part, the hypothetical line joining the proximal end being substantially superposed on the outline of the cavity,
  the metal label is removable,
  the second part of the pattern covers at most half of the surface of the antenna,
  the second metal lines covering the surface of the antenna are arranged such that the total surface formed by the second lines is less than half of the surface of the antenna covered by the second part of the pattern,
  the second metal lines have a maximum width of 1 mm,
  the card body comprises a printed plastic layer covering the metal layer and the cavity, the printed layer having positioning marks for positioning the label on the card body,
  the printed layer forms a print covering the cavity, the print complementing the second metal lines, so as to guide the positioning of the label on the card and so as to form a second part of pattern that is coloured,
  the metal lines are formed from a metal of low conductivity exhibiting a conductivity less than or equal to $40*10^6$ S·m$^{-1}$ (Siemens per metre),
  a chip is connected to the ends of the antenna and incorporated in the body of the chipcard, the chip being positioned opposite a zone without metal lines.

Other features and advantages of the present invention will emerge from the description given below, with reference to the attached drawings, which illustrate exemplary embodiments thereof that are in no way limiting.

FIG. 1 is a schematic cross-sectional view of a chipcard according to the invention;

FIG. 2 is a front view of a chipcard according to the invention in which the label represents a first pattern;

FIG. 3 is a view similar to that of FIG. 2 representing a chipcard according to the invention in which the label represents a second pattern;

DESCRIPTION OF THE EMBODIMENTS

Figure 4A:
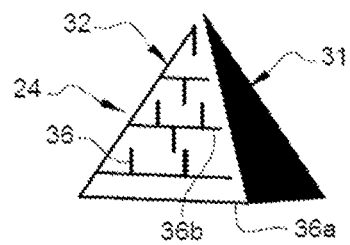
FIG. 4c is a view similar to that of FIG. 2 representing a chipcard according to the invention in which the label represents a third pattern, the label being illustrated in FIG. 4a and the body of the card in FIG. 4b.

From the prior art, several types of metallic card structures are known. The metallic chipcards generally comprise a body formed by one or more dielectric layers, that are not conductive, that is to say that cannot conduct electrical current, such as a layer of plastic or a layer of resin, and at least one metal layer. The assembly of the metal layer with the dielectric layer can be done in different ways that are well known to the person skilled in the art, for example by bonding or even by lamination with a layer of plastic or even by coating the metal layer in a layer of resin. As an example, the layers of plastic are composed of polymers such as PVC, PET, PC, ABS.

The metallic chipcards comprise an antenna to be able to communicate remotely with a reader. As indicated in the foreword, this relates then to an operation referred to as "NFC contactless" mode. In this case, the structure of the metal card must be adapted in order for the latter not to form a metal shielding that disrupts, even prevents, the communication with an external reader.

Some choices of the prior art have resolved this problem by allowing a contactless communication when the card is positioned according to a particular orientation. To this end, the antenna is completely covered by the metal layer only on a first face of the card, which allows the antenna to be able to communicate with a reader only from a second face of the card. That requires the user to orient the card such that the second face is placed facing the reader for the metal layer not to be positioned between the antenna and the reader and thus for the communication signal not to be disturbed by this metal layer. This embodiment is restrictive in that it imposes a particular orientation of the card on the user. Furthermore, the thickness of the metal layer is limited by the presence of a magnetic shielding layer, such as a layer of ferrite, and by the overall thickness of the card which must always conform to the ISO7810 standard, that is to say an inclusive thickness substantially equal to 760 µm. Consequently, the proportion of metal in the card is therefore limited, and thus the increase in the weight of the card is also limited. Furthermore, the visual appearance of the card on the second face is a plastic appearance, which does not therefore correspond to the expectations of the user.

The invention proposes a novel type of metallic chipcard 10 comprising a card body 12, extending between a top face and a bottom face, and formed by at least one metal layer 14, possibly covered by a coloured coating, such as an ink or a metal oxide, or even a dielectric layer such as a plastic layer 40 receiving a print 42. The metal layer has the same surface dimensions as the top face and the bottom face of the card body. The card body 12 is delimited by an edge having several thicknesses, including that of the metal layer.

The metal layer 14 is delimited between a first face and a second face having the dimensions of a chipcard 10 as defined in the ISO7810 standard. The metal layer 14 is produced in a metal, preferably having a high density and that is corrosion-resistant. As an example, the chosen metal is stainless steel, silver, gold, copper or even tungsten. The metal layer 14 further comprises a through-cavity 16 opening on the first and second faces. This cavity 16 has a form adapted to receive one or more electronic components, whether passive or active, mounted on a substrate, the whole being called "inlay 20".

The metal layer 14 further comprises a slit 15 passing through the thickness of the metal layer 14 and extending between the cavity 16 and an outer edge of the metal layer 14, forming a part of the thickness of the outer edge of the card body. This slit 15 advantageously makes it possible to limit or prevent the formation of the eddy currents that can disturb the communication capabilities of the antenna 22. Indeed, these slits limit the main loops of eddy current likely to be generated around the antenna 22.

According to the invention, the cavity 16 of the metal layer 14 accommodates an inlay 20 formed by an antenna 22 arranged on a dielectric substrate, and possibly a chip connected to the ends of the antenna 22. The cavity 16 of the metal layer 14 is delimited by an outline 18 that is greater than that of the inlay 20, such that the latter can be housed entirely in the cavity 16. Preferably, the inlay 20 and therefore the antenna 22 extend in a plane of the cavity 16 of the metal layer 14.

The substrate of the inlay 20 traditionally used is a polymer that is very stable to temperature changes. That can be a polyimide, such as Kapton, that is stable within a wide temperature range of from −200° C. to +400° C., which makes it possible to maintain stability during the different card manufacturing steps, during temperature rises.

The antenna 22 comprises one or more electrically conductive turns making it possible to establish a contactless communication with an external terminal (not represented) provided for this purpose. The turns of the antenna 22 can be formed by a track, a wire or an electrically conductive member deposited on a support (not represented). Various manufacturing techniques (wiring, by additive deposition, by etching) that are well known in themselves can be used to produce such an RF antenna 22. The physical characteristics (form/size of the intersection, length of the antenna 22, number of turns, material, etc.) of the antenna 22 can be adapted on a per-case basis notably in order to allow wireless communications at the desired frequency (or frequency range).

The chip can be connected directly to the ends of the antenna 22 in the card body 12, or mounted on a module mounted flush with the surface of the card and connected to the ends of the antenna 22 by techniques known to the person skilled in the art, such as an anisotropic conductive adhesive.

Generally, the metal layer 14 and the inlay 20 are coated in a resin hardened after cross-linking and adapted to receive a coloured coating or a printed polymer layer.

In order to avoid masking the metallic appearance, the resin is chosen to be transparent. Furthermore, in order for the two faces of the card to be smooth, a plastic layer 40 of polymer is assembled on each side of the assembly formed by the resin-coated metal layer 14. However, the inlay 20 and the antenna 22 then remain completely visible, which renders the card unappealing.

The invention proposes positioning a metallic label 24 on one of the two faces of the card in order to visually cover the cavity 16 receiving the antenna 22. The label 24 comprises a substrate 26 receiving an adhesive 28 on one face for the fixing of said label 24 and a metal layer 14 on the other face.

According to a variant embodiment that is not illustrated, the label comprises only a substrate receiving the metal layer, and is fixed by an adhesive that is dissociated from the label and deposited on the card body.

It is also possible to replace the adhesive by any other fixing means that is known and obvious to the person skilled in the art, this fixing means being able to be assembled directly on the substrate of the label or even independent of the label and disposed on the card body.

It is thus possible to enhance the visual appearance of these cards and to emphasise the metallic effect thereof by at least partially covering the inlay 20 of the antenna 22, without modifying the existing manufacturing methods, and without modifying the internal structure of the card body 12.

The metallic label 24 defines a visual pattern 30 formed from metal lines etched on the substrate 26. Various examples of patterns 30 are illustrated in FIGS. 2 to 4 of the present application. The metal lines are produced in a metal of low conductivity, such as aluminium or metal oxides which have a conductivity less than $40*10^6$ S·m$^{-1}$ (Siemens per metre) and which make it possible to allow the magnetic flux to pass through. As represented in FIGS. 2 to 4, these patterns 30 can represent an object or an animal, but any other form could be used in the conditions stated hereinbelow.

The label 24 is constructed so as to limit the disturbances affecting the performance of the antenna 22 and the spurious effects hampering the communication with an external reader. To this end, the label 24 comprises a first part 31 formed by first etched metal lines 34 and a second part 32 and composed of second etched metal lines 36 forming only open loops. Only the second part 32 is situated opposite the antenna, the first part 31 being disposed at the periphery of a zone formed by the projection of the antenna in the plane of the label.

The first etched metal lines 34 delimit between them at least one metallic zone that is solid metal or partially filled with metal. All the dispositions of the first lines can be envisaged because the first part 31 of the label 24 is not opposite the antenna and therefore has no impact on the communication capabilities of the antenna. It is therefore possible to envisage the first metal lines 34 forming open loops or closed loops which delimit one or more zones that are totally or partially filled with metal. A closed loop is understood to mean metal lines having at least one intersection with another metal line in the zone delimited by the first part 31. Open loop is understood to mean metal lines extending between a first end 36a and a distal end 36b, and with no intersection with other metal lines in the zone delimited by the first part 32.

Preferably, the first part 31 of the label 24 is completely covered with metal so as to make the weight of the label 24, and consequently that of the chipcard 10, heavier. The metal layer covering the first part 31 of the label 24 is made of metal, preferably of low electrical conductivity such as aluminium or the metal oxides such as copper oxide. Metals with high electrical conductivity can also be used (Cu, Ag, Au etc) by virtue of the small thickness of this layer. This layer has a thickness of from a few hundreds of nm to a few tens of μm provided that the overall thickness of the card remains within the ISO 7810 range, as indicated above in the description.

The second part 32 of the label 24 is formed by etching second metal lines 36 on the substrate 26, these second metal lines 36 forming open loops and being electrically insulated from one another. According to a variant embodiment that can be seen in FIG. 3, the second part 32 of the label 24 is delimited by an outline 38 which is drawn by a hypothetical line linking the first ends, or proximal ends, then the distal ends of the second metal lines 36. As represented in FIG. 3, the hypothetical line joining the proximal ends is substantially superposed on the outline 18 of the cavity 16.

The label 24 is arranged on the card body 12 such that the antenna 22 is covered only by the second part 32 of the pattern 30. Thus, the antenna 22 is covered only by the second metal lines that are electrically insulated from one another, which makes it possible to avoid the occurrence of eddy currents circulating on these second metal lines 36, when the metallic chipcard 10 is passed through by the magnetic field of the external reader. Indeed, these second metal lines 36, forming open loops, limit the main eddy current loops likely to be generated above or below the antenna 22. Preferably, the outline 38 of the pattern 30 linking the first ends 36a is substantially identical and superposed on the outline 18 of the cavity 16.

Advantageously, the first metal lines 34 and second metal lines 36 together form a pattern 30 that is perfectly discernible for the user. To this end, each second line of the second part 32 of the pattern 30 prolongs a first line of the first part 31 of the pattern 30, such that the second part 32 of the pattern 30 forms the continuity of the first part 31 of the pattern 30 to form the pattern 30 in its entirety. This chaining-together offers an aesthetic appearance while maintaining the main functionality of the label 24, namely to cover the antenna 22 without disturbing its operation.

The adhesive 28 allowing the label to be fixed will be chosen from among the adhesives known to the person skilled in the art according to the type of fixing desired, that is to say to obtain a reversible fixing, to obtain a label 24 that is removable, or non-reversible, in order to obtain a label 24 secured to the card. In the case where the label 24 is removable, marks can be provided on the card body 12 in order to guide the user for the positioning of the label 24, and the metal label 24 is positioned such that only the second part 32 of the pattern 30 covers the antenna 22.

According to a preferred embodiment, the second part 32 of the pattern 30 covers at most a portion of surface formed by the antenna 22. This portion is at most half of the surface of the antenna 22. The antenna 22 is formed by turns wound from the outside to the inside, and the surface of the antenna 22 is delimited by the outermost turn. The second part 32 of the pattern 30 covering the antenna 22, covers at most half of the surface delimited by the outer turn. These provisions ensure the correct operation of the antenna 22 for the latter to be able to communicate with the external terminal without disturbance.

Furthermore, the second metal lines 36 covering the surface of the antenna 22 are arranged such that the total surface formed by the second lines 36 is less than half of the surface of the antenna 22 covered by the second part 32 of the pattern 30 in order for the label 24 not to hamper the radiofrequency communication between the antenna 22 and the terminal.

Advantageously, in the context of the condition stated in the preceding paragraph, the second lines have a maximum width of 1 mm. This width best addresses the trade-off between the difficulty in producing very fine lines in order to have a good visibility of the patterns, and the impact of the metal on the magnetic flux and therefore on the performance of the antenna.

Figure 4B:
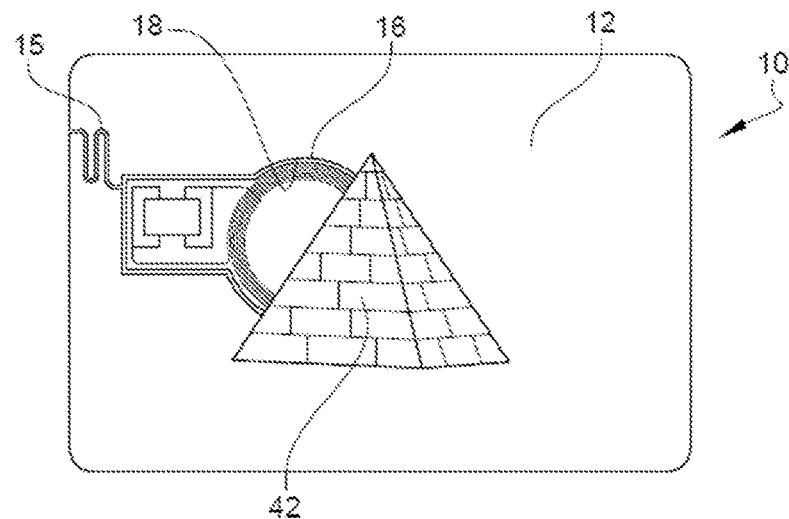
Figure 4C:
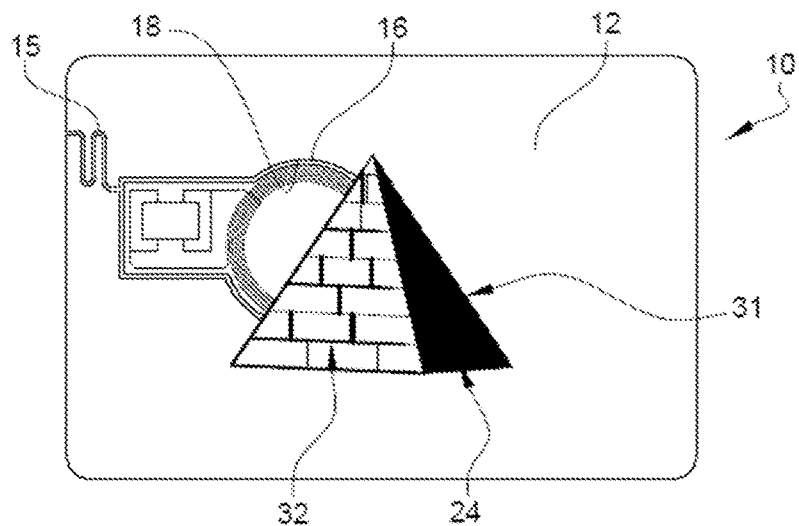

According to an embodiment illustrated in FIG. 4c, the metallic label 24 is associated with print elements 42 produced on the card to facilitate the positioning thereof. To this end, the print elements 42 are formed by the coating deposited on the metal layer 14, or even by printing on the transparent plastic layer 40 covering the metal layer 14. The print elements 42 comprise positioning marks for guiding the placement of the label 24 on the card body 12. These positioning marks can be simple patterns, such as a dot or a cross, or even complex patterns complementing the pattern formed by the second part 32 of the label 24. As can be seen in FIG. 4b, the print elements 42 illustrate a pyramid formed by blocks. Each of the blocks forms a complementary pattern making it possible to adjust the label 24. To this end, the label 24 has second metal lines 36 drawing the blocks of a pyramid that can be easily superposed on the blocks printed on the card. It is then easier to put the metallic label 24 in place on the card body 12, during manufacture or during use by the holder of the card. Furthermore, that makes it possible to form a coloured pattern 30 on the second part 32 of the label 24.

In the case where the chipcard 10 comprises a chip incorporated inside the body 12, that is to say fixed directly onto the ends of the antenna 22, a check will be made to ensure that the label 24 does not cover the chip such that the chip is positioned facing a zone without lines.

The invention claimed is:

1. A chipcard comprising:
   a card body formed by at least one dielectric layer and at least one metal layer superposed on the dielectric layer, the at least one metal layer including a cavity passing through its thickness and having an outline, the at least one metal layer further including a slit passing through its thickness and extending from the cavity to an edge of the card body;
   an antenna extending in a plane of the cavity of the at least one metal layer;
   at least one metal label at least partially covering the cavity and the antenna, the at least one metal label being fixed onto one of faces of the chipcard, the at least one metal label having a second metal layer, the second metal layer including a pattern represented by etched metal lines,
   wherein the pattern of the second metal layer has a first part formed by first etched metal lines delimiting at least one zone that is at least partially of metal, and a second part composed of second etched metal lines forming only open loops,
   wherein each second etched metal line of the second part of the pattern prolongs a first etched metal line of the first part of the pattern, such that the second part of the pattern forms a continuity of the first part of the pattern to form the pattern in its entirety, and
   wherein the at least one metal label is positioned such that only the second part of the pattern is disposed opposite the antenna.

2. The chipcard according to claim 1, wherein the each of the second etched metal lines extend between a proximal end and a distal end and do not intersect with any etched metal line, and
   wherein an outline of the second part is delimited by a hypothetical line joining all of points forming the proximal ends and the distal ends of the second etched metal lines of the second part, the hypothetical line joining the proximal ends being superposed on the outline of the cavity.

3. The chipcard according to claim 2, wherein the at least one metal label is removable.

4. The chipcard according to claim 2, wherein the second part of the pattern covers at most half of a surface of the antenna.

5. The chipcard according to claim 2, wherein the second etched metal lines covering a surface of the antenna are arranged such that a total surface formed by the second etched metal lines is less than half of the surface of the antenna.

6. The chipcard according to claim 2, wherein the second etched metal lines have a maximum width of 1 mm.

7. The chipcard according to claim 1, wherein the at least one metal label is removable.

8. The chipcard according to claim 7, wherein the second part of the pattern covers at most half of a surface of the antenna.

9. The chipcard according to claim 7, wherein the second etched metal lines covering a surface of the antenna are arranged such that a total surface formed by the second etched metal lines is less than half of the surface of the antenna.

10. The chipcard according to claim 7, wherein the second etched metal lines have a maximum width of 1 mm.

11. The chipcard according to claim 1, wherein the second part of the pattern covers at most half of a surface of the antenna.

12. The chipcard according to claim 11, wherein the second etched metal lines covering a surface of the antenna are arranged such that a total surface formed by the second etched metal lines is less than half of the surface of the antenna.

13. The chipcard according to claim 11, wherein the second etched metal lines have a maximum width of 1 mm.

14. The chipcard according to claim 1, wherein the second etched metal lines cover a surface of the antenna and are arranged such that a total surface formed by the second etched metal lines is less than half of a surface of the antenna.

15. The chipcard according to claim 14, wherein the second etched metal lines have a maximum width of 1 mm.

16. The chipcard according to claim 1, wherein the second etched metal lines have a maximum width of 1 mm.

17. The chipcard according to claim 1, wherein the card body includes a printed plastic layer covering the at least one metal layer and the cavity, the printed plastic layer having positioning marks for positioning the at least one metal label on the card body.

18. The chipcard according to claim 17, wherein the printed plastic layer forms a print covering the cavity, the print complementing the second etched metal lines, to guide the positioning of the at least one metal label on the chipcard and to form a coloured portion.

19. The chipcard according to claim 1, wherein the first etched metal lines and the second etched metal lines are formed from a metal of low conductivity exhibiting a conductivity less than or equal to $40*10^6$ S·m$^{-1}$.

20. The chipcard according to claim 1, wherein a chip is connected to ends of the antenna and incorporated in the card body of the chipcard, the chip being positioned opposite a zone without metal lines.

* * * * *